United States Patent [19]
Conley

[11] Patent Number: 5,533,676
[45] Date of Patent: Jul. 9, 1996

[54] MULTI-PURPOSE LAWN CARE MACHINE

[76] Inventor: Rick A. Conley, 10041 Harriott Rd., Marysville, Ohio 43040

[21] Appl. No.: 344,998

[22] Filed: Nov. 25, 1994

[51] Int. Cl.⁶ .......................... A01D 34/00; A01C 19/04
[52] U.S. Cl. ...................... 239/663; 239/168; 239/681; 239/289; 56/16.8
[58] Field of Search .......................... 239/663, 172, 239/166, 168, 289, 666, 670, 681; 56/16.8; 222/613, 623–625

[56] References Cited

U.S. PATENT DOCUMENTS

| | | | |
|---|---|---|---|
| 3,565,341 | 11/1968 | Burroughs | 239/168 |
| 3,857,515 | 12/1974 | Zennie | 56/16.8 X |
| 3,942,308 | 3/1976 | Vicendese et al. | 56/16.8 |
| 4,813,604 | 3/1989 | Curran | 239/172 X |
| 4,821,959 | 4/1989 | Browning | 56/16.8 X |
| 5,195,308 | 3/1993 | Grote et al. | 56/16.8 X |
| 5,333,795 | 8/1994 | Jessen | 239/663 |
| 5,340,033 | 8/1994 | Whitell | 239/681 X |
| 5,385,306 | 1/1995 | Cervenka | 239/289 X |

*Primary Examiner*—Kevin P. Weldon
*Attorney, Agent, or Firm*—Thomas S. Baker, Jr.

[57] ABSTRACT

A lawn care machine including an engine powered mower unit having a front deck element which overlies a blade cutting element and which mounts a liquid storage container for a liquid material spraying unit and a particulate container for a granular spreading unit. The deck being pivotally mounted to the tractor. An operator-seat positioned on the front of the tractor to overlook the front deck.

15 Claims, 2 Drawing Sheets

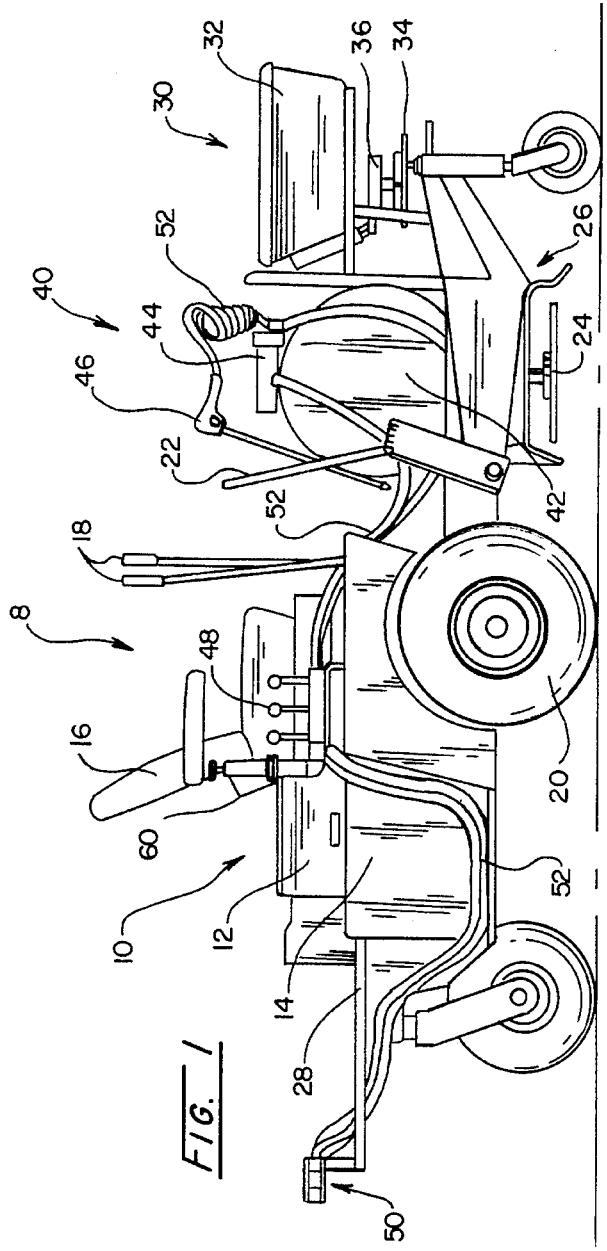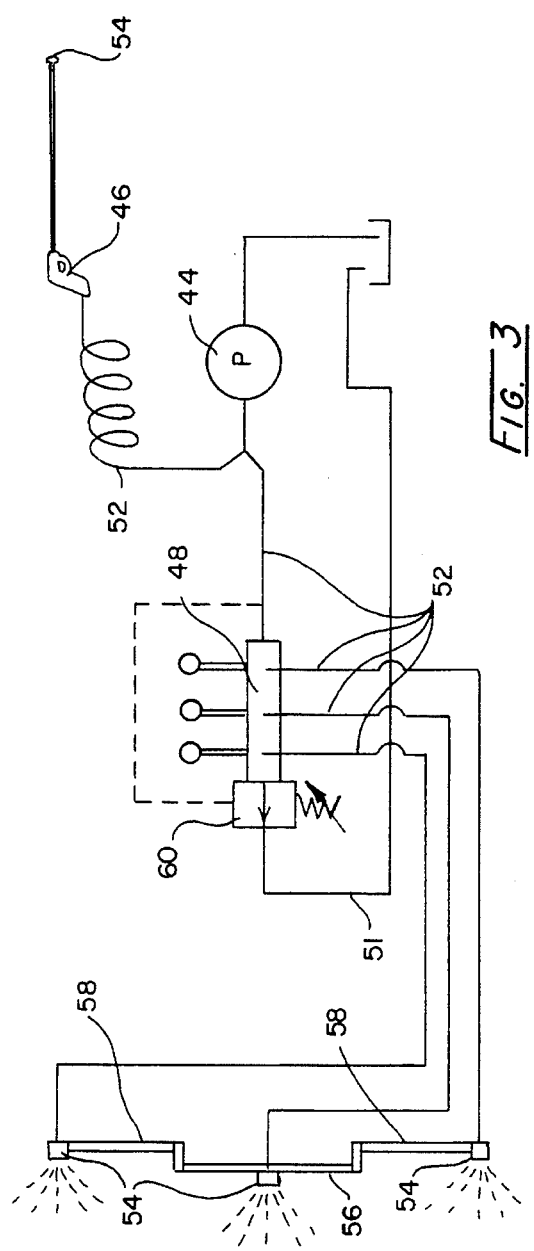

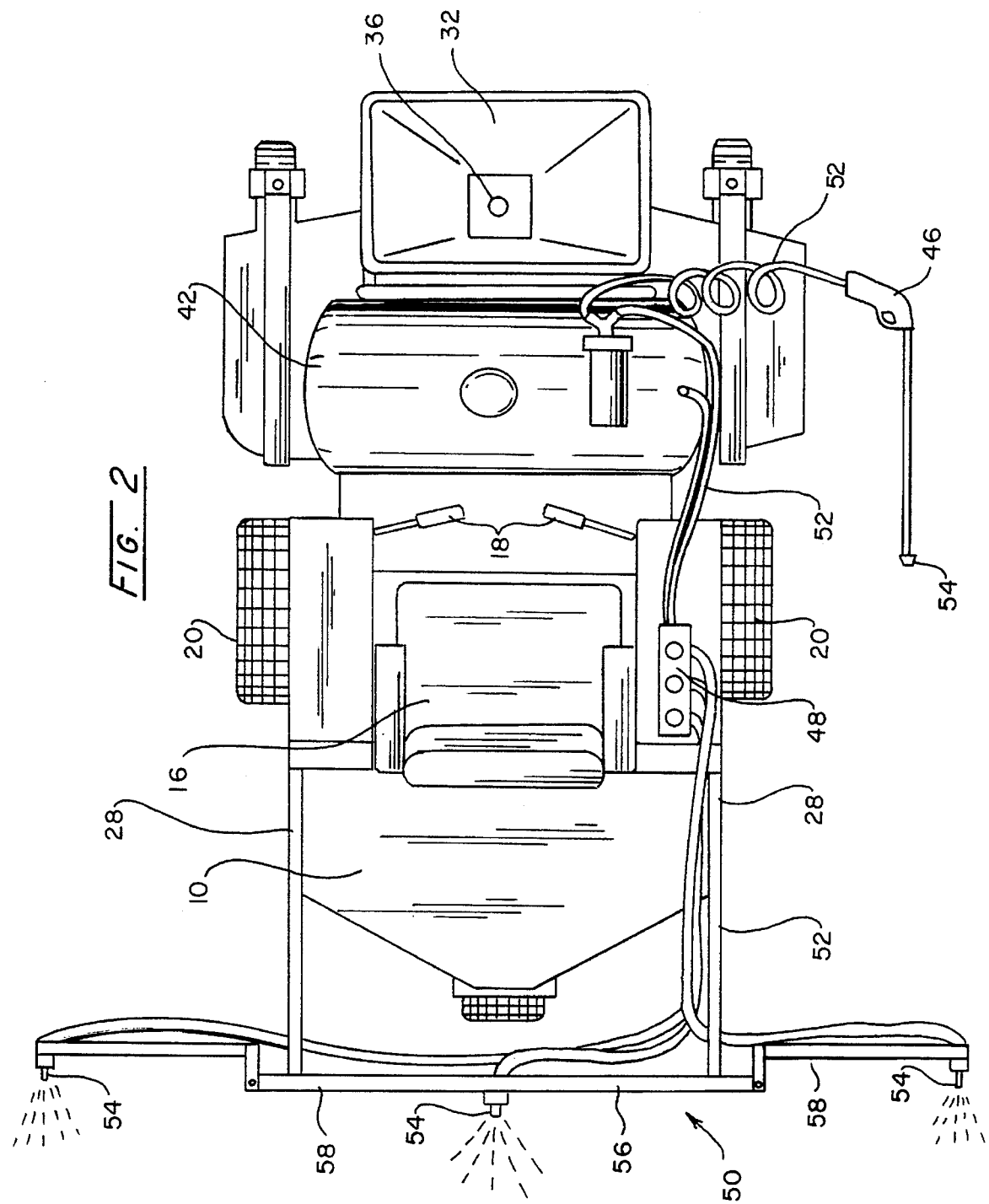

MULTI-PURPOSE LAWN CARE MACHINE

FIELD OF THE INVENTION

This invention relates in general to machines for lawn treatment. More particularly, it concerns a mobile riding machine capable of performing the operations of mowing, applying solid granular fertilizer, and spraying liquid weed killer or insecticide in one task.

BACKGROUND OF THE INVENTION

Commercial lawn maintenance is a labor intensive task. Beside the frequent mowing of the lawn to the desired height, proper lawn maintenance additionally includes the steps of applying fertilizer, where the fertilizer is mainly available as solid, granular material, and of spraying liquid weed killers, insecticides and the like over the lawn.

The step of mowing the lawn has been greatly facilitated by the introduction of riding lawn mowers. But there still remain three different lawn care operations to be carried out, i.e., mowing the lawn, applying solid granular fertilizer to the lawn, and spraying liquid weed killers or insecticides over the lawn. Conventionally, these three operations were carried out independently, one after the other, which is not only time consuming, but also requires three different machines. It is expensive to acquire and maintain the machines, burdensome to transport multiple machines, and costly to separately store the machines. Some attempts have been made to combine at least some of these functions in a single machine. However, such combinations mainly have occurred in connection with manually operated walk-behind machines.

In U.S. Pat. No. 3,942,308, granted to Vicendese et al., a walk-behind power-driven lawn mower having a storage bin for dispensing solid granular chemicals from the rear portion thereof is disclosed.

A riding lawn mower having a liquid spray device is disclosed e.g. in U.S. Pat. No. 4,821,959, granted to Browning. However, in this machine the liquid supply tank is elevated even above the seat of the operator, which greatly makes the vehicle less stable and more likely to tip, especially when it is operating on sloped surfaces.

In U.S. Pat. No. 4,352,463, granted to Baker, a lawn treatment spreader machine, having a supply hose attached to a large tank on a truck, for wet and dry materials is disclosed. This machine doesn't include a lawn mower.

Considering the aforementioned three lawn care operations necessary for proper lawn maintenance, none of the prior art devices offers the possibility to carry out these operations in a single step. Nevertheless it would be of great advantage if the lawn care operations involving the mowing, the application of solid granular fertilizer, and the spraying of liquid weed killers or insecticide could be combined in one task, and it would be an additional convenience, if a machine providing these possibilities would be a riding machine. Accordingly, these are the goals which are to be reached by the present invention.

SUMMARY OF THE INVENTION

The present invention achieves the aforementioned goals by providing a multiple-purpose lawn care machine consisting of a riding lawn mower, to which a dispenser for solid granular fertilizer and a spraying unit for liquid weed killers or insecticides are attached. The lawn mower comprises a rear part or tractor containing the engine and the traction wheels, and a front mower deck containing the rotating blades, which is pivotally attached to the tractor in order to provide an excellent steerability of the mower. The dispensing unit or spreader for solid granular fertilizer is mounted on the front deck of the lawn mower and includes a storage bin to contain the fertilizer, a revolving impeller blade driven by an electric motor to spread the fertilizer, and control means to switch on and off the impeller and to open and shut the outlet of the storage bin. The impeller blade is installed in front of the front deck of the mower and spreads the fertilizer forwardly over the lawn. The spraying unit consists of a storage tank for containing the liquid weed killers or insecticides, an electrically-driven pump, a spray bar holding the spray-jet nozzles, a spray gun with an additional nozzle providing the possibility for manually spraying liquid weed killers or insecticides to remote areas which cannot be reached by the spray bar, control valves for controlling the flow of liquid to the different nozzles, and hoses for transporting the liquids from the tank to the nozzles. The tank is mounted in front of the operator on the front deck of the lawn mower, the spray bar is attached at the rear end of the mower tractor. The spray bar is divided into three sections, a middle section which is directly attached to the frame of the tractor, and two outboard sections which are pivotally attached at the ends of the middle section, in order the bar to be folded for transport and parking and to be unfolded for spraying. During operation the liquids are sprayed rearwards over the lawn. Each of the sections of the spray bar can be controlled by separate valves, so that the operator can spray one, two or three lanes in one single pass.

Thus, the present invention offers the unique possibility to selectively perform one or more of three different lawn care operations in a single step: first solid granular fertilizer may be spread over the lawn in front of the lawn care machine, second, the lawn may be cut to a desired height or not cut, and third, liquid weed killers or insecticides may be selectively sprayed over the lawn behind the machine. Each of the three operations may be activated or deactivated independently by the operator, and no interference problems are caused between any of the three operations. Because the two possibly heavy storage means, i.e., the tank for the spraying unit and the storage bin for the spreader, are both placed at a relatively low position on the front deck of the mower, the entire lawn care machine is quite stable and therefore can operate also on a sloping surfaces.

BRIEF DESCRIPTION OF THE DRAWING

FIG. 1 is a side view of a preferred embodiment of the riding lawn care machine of this invention consisting of a lawn mower, means for dispensing solid granular fertilizer, and means for spraying liquid weed killer or insecticide.

FIG. 2 is a plan view of the lawn care machine of FIG. 1.

FIG. 3 is a schematic view of the liquid spraying unit of the present invention.

DETAILED DESCRIPTION

Referring to FIGS. 1 and 2, the lawn care machine (6) of the present invention is shown consisting of a lawn mower (8), a spreader for solid granular fertilizer (30), and a spraying unit for liquid weed killers or insecticides (40). The lawn mower of the preferred embodiment was a commercially available, rear engine driven, riding-type lawn mower. Such mower has a rear part or tractor (10) and a front deck (26) containing the rotating grass cutting blades (24). The seat (16) for the operator is positioned in front of the engine

(12) and the fuel tank (14). The engine drives the traction wheels (20) and the rotating blades (24) by means for power transmission (not shown), e.g. pulleys, belts, chains, and gears, as is known in the art. The height of the rotating blades (24) is controlled by a deck height adjustment device (22). The front deck (26) is pivotally attached to the tractor (10), and the operator steers the mower (8) by using the joysticks (18), which control the azimuth angle between the front deck (26) and the tractor (10), thus steering the mower.

The unit (30) for dispensing solid granular fertilizer is mounted in front of the mower deck (26). It consists of a storage bin (32) for storing the fertilizer, a revolving impeller blade (34) driven by an electric motor (not shown) for spreading the fertilizer, and an outlet (36) of the storage bin by which the fertilizer flows onto the impeller blade (34). Control means (not shown) allow the operator to switch on and off the electric motor, which drives the impeller, and to open and shut the outlet (36) of the storage bin. A shield (not shown), mounted just behind the impeller blade, prevents the impeller from spreading the fertilizer towards the lawn care machine (6), so that the fertilizer is spread over the lawn mainly forwardly. The storage bin (32) is mounted on the housing of the front deck (26) as low as possible, as is the tank (42) of the spraying unit (40), in order to make the lawn care machine more stable and less likely to tip when operating on sloping surfaces.

The tank (42) of the spraying unit (40) is positioned behind the storage bin (32) of the spreader (30) on the front deck (26), just in front of the operator. An electrically-driven pump (44) sucks the liquid out of the tank (42) and provides it to a system of supply hoses (52) at an elevated pressure. Pressure in the supply hoses is controlled with the variable pressure regulator (60), and liquids removed by the pressure regulator (60) from the supply hoses (52) in order to reduce the pressure are conducted back to the tank (42) through the return house (51), as is shown in FIG. 3. The pressure regulator (60) as well as the control valves (48) for the spray bar (50) are placed between the pump (44) and the spray bar (50) into the system of supply hoses (52), and they are positioned beside the seat (16) in order to be reached easily by the operator when the lawn care machine is operated. The spray bar (50) is attached at the rear end of the frame (28) of the mower (8). It consists of three sections, a middle section (56), which is directly attached to the frame (28) of the mower, and two outboard sections (58), which are pivotally attached to the ends of the middle section (56). Thus, when the lawn care machine is being transported or stored, the spray bar (50) can be folded, and it is unfolded when the spraying unit is operated. Each section of the spray bar is equipped with jet nozzles (54) which allow a regular, even spraying of the liquid. The jet nozzles (54) of each section can be controlled by valves (48), so that the operator can choose to spray one, two or three lanes in a single pass. Since the spray bar (50) is positioned at the back end of the lawn mower (8), the nozzles (54) are directed rearwards, so that during operation the liquids are sprayed rearwards over the lawn. The spraying unit (40) is further equipped with a spray gun (46) containing an additional nozzle (54), which is used for manually spraying liquid weed killers or insecticides to areas behind trees, bushes, etc., which cannot be reached by the spray bar (50). The spray gun (46) is fed by the same pump (44) as the spray bar (50), and it includes an additional valve inside the handhold of the gun for controlling the manual spraying with the gun. In accordance with the present invention, by way of example and not limitation, it has been found that the spraying unit worked well when a 60 PSI electric pump and ½" plastic supply hoses were used to provide the liquids to the nozzles.

In the preferred embodiment as described above and as depicted in the drawings, the invention related to a rear engine driven riding lawn mower. In another embodiment, a stand-behind lawn mower can be used instead of a riding lawn mower, and in a third embodiment, a walk-behind lawn mower can be used. The changes necessary to incorporate the elements of the present invention into the alternate machine embodiments are readily done by one skilled in the art. It is well understood that all descriptions and illustrations made in connection with the aforementioned preferred embodiment are to be interpreted in an illustrative and not in a limiting sense, and it will be apparent to those skilled in the art, that various changes in the devices of the present invention may be made without departing from the scope of the present invention.

I claim my invention as follows:

1. A multi-purpose lawn care machine comprising:

an engine powered mower unit having at least one horizontally rotating lawn-cutting blade and a deck housing element positioned generally above the cutting blade in blade-supporting relation;

wherein said engine powered mower unit includes a tractor having an engine, a fuel tank, traction wheels and an operator seat mounted behind and above said deck housing element in order for the operator to be positioned to overlook said deck housing element;

said deck housing element positioned in front of said engine and pivotally attached to said tractor;

a fertilization unit having a granular materials storage bin means mounted on the front end of said mower unit deck housing element and having a selectively operated dispenser means which impels granular materials received from said storage bin means away from said deck housing element;

a weed killer or insecticide sprayer unit having a liquid storage tank means mounted on said mower unit deck housing element behind said storage bin means and having selectively operated pump means which flows liquid received from said storage tank means for spraying away from said mower unit deck element; and control means for selectively operating either or both of said fertilizer unit and said weed killer or insecticide sprayer unit.

2. The lawn care machine defined by claim 1, wherein the sprayer unit includes a spray bar, which can be folded while transporting or storing the machine and unfolded while operating the machine.

3. The lawn care machine defined by claim 2, wherein the sprayer unit comprises control valves for independently controlling several sections of the spray bar, in order to spray only selected lanes in a single pass.

4. The lawn care machine defined by claim 1, wherein the sprayer unit includes a variable pressure regulator for controlling the pressure in the spraying unit.

5. The lawn care machine defined by claim 1, wherein the sprayer unit additionally comprises a spray gun for manually spraying remote areas.

6. The lawn care machine defined by claim 1, additionally comprising control means for independently activating and deactivating each of the three functions of mowing, spreading solid materials, and spraying liquid materials.

7. The lawn care machine defined by claim 1, wherein said dispenser means of said fertilization unit includes a rotating impeller blade mounted in front of said mower unit and a shield mounted behind said impeller blade, in order to prevent the fertilizer being spread towards said lawn care machine.

8. The lawn care machine defined by claim 1, wherein said engine-driven mower unit comprises a step-behind or a walk-behind lawn mower.

9. A multi-purpose lawn care machine comprising:

an engine-powered riding mower unit having at least one horizontally rotating lawn-cutting blade and a deck housing element positioned generally above the cutting blade in blade-supporting relation; and a fertilization unit having a granular materials storage bin means mounted on said mower unit deck housing element and having a selectively operated dispenser means which impels granular materials received from said storage bin means away from said deck housing element wherein said engine-driven mower unit comprises a tractor having an engine, a fuel tank, and traction wheels, and a front deck having a front deck housing element and one or more grass cutting rotating blades, said front deck being pivotally attached to said tractor, and said tractor having an operator-seat mounted in front of the engine and fuel tank in order for the operator to be pisitioned to overlook the front deck.

10. The lawn care machine defined by claim 9, additionally comprising control means for independently activating and deactivating each of the two functions of mowing and spreading solid materials.

11. The lawn care machine defined by claim 9, wherein said dispenser means of said fertilization unit includes a rotating impeller blade mounted in front of said mower unit and a shield mounted behind said impeller blade, in order for preventing the fertilizer being spread towards said lawn care machine.

12. The lawn care machine defined by claim 9, wherein said storage bin means of said fertilization unit is mounted at a low position on said deck housing element in order to make said lawn care machine more stable and less likely to tip.

13. A multi-purpose lawn care machine comprising:

an engine powered mower unit having at least one horizontally rotating lawn-cutting blade and a deck housing element positioned generally above the cutting blade in blade-supporting relation;

a fertilization unit having a granular materials storage bin means mounted on the front end of said mower unit deck housing element and having a selectively operated dispenser means which impels granular materials received from said storage bin means away from said deck housing element;

a weed killer or insecticide sprayer unit having a liquid storage tank means mounted on said mower unit deck housing element behind said storage bin means and having selectively operated pump means which flows liquid received from said storage tank means for spraying away from said mower unit deck element;

control means for selectively operating either or both of said fertilizer unit and said weed killer or insecticide sprayer unit;

wherein the sprayer unit includes a spray bar, which can be folded while transporting or storing the machine and unfolded while operating the machine; and wherein said engine-driven mower unit comprises a tractor having an engine, a fuel tank, and traction wheels, and a front deck having a front deck housing element and one or more grass cutting rotating blades, said front deck being pivotally attached to said tractor, and said tractor having an operator-seat mounted in front of the engine and fuel tank in order for the operator to be positioned to overlook the front deck.

14. The lawn care machine defined by claim 13, wherein said dispenser means of said fertilization unit is mounted in the front of said front deck for spreading solid granular fertilizer forwardly, and said spray bar of said spraying unit is attached at the rear end of said tractor for spraying liquid materials backwardly.

15. The lawn care machine defined by claim 13, wherein said storage bin means of said fertilization unit and said storage tank means of said sprayer unit are both mounted at a low position on said deck housing element in order to make said lawn care machine more stable and less likely to tip when operating on sloping surfaces.

* * * * *